(12) United States Patent
Kubota et al.

(10) Patent No.: US 12,107,462 B2
(45) Date of Patent: Oct. 1, 2024

(54) POWER SUPPLY CIRCUIT AND ROTARY ELECTRIC MACHINE SYSTEM

(71) Applicant: HONDA MOTOR CO., LTD., Tokyo (JP)

(72) Inventors: Yoshihisa Kubota, Saitama (JP); Shogo Miyazaki, Saitama (JP); Satoyoshi Oya, Saitama (JP); Takumi Todoroki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 239 days.

(21) Appl. No.: 17/945,731

(22) Filed: Sep. 15, 2022

(65) Prior Publication Data

US 2023/0098598 A1     Mar. 30, 2023

(30) Foreign Application Priority Data

Sep. 21, 2021   (JP) ................................. 2021-153634
Feb. 28, 2022   (JP) ................................. 2022-030056

(51) Int. Cl.
  *H02P 27/06*   (2006.01)
  *H02K 11/33*   (2016.01)

(52) U.S. Cl.
  CPC .............. *H02K 11/33* (2016.01); *H02P 27/06* (2013.01)

(58) Field of Classification Search
  CPC ........ H02K 11/33; H02P 27/06; H02P 25/188
  See application file for complete search history.

(56) References Cited

U.S. PATENT DOCUMENTS

| 5,969,919 A | 10/1999 | Kobayashi et al. |
| 2020/0395875 A1 | 12/2020 | Miyama et al. |

FOREIGN PATENT DOCUMENTS

| JP | H11-098888 A | | 4/1999 |
| JP | 2011045181 A | * | 3/2011 |
| JP | 2011-244576 A | | 12/2011 |
| JP | 2019146383 A | * | 8/2019 |
| WO | WO 2019/155756 A1 | | 8/2019 |
| WO | WO 2019/163025 A1 | | 8/2019 |

OTHER PUBLICATIONS

Aug. 29, 2023, Translation of Japanese Office Action issued for related JP Application No. 2022-030056.

* cited by examiner

*Primary Examiner* — Mohamad A Musleh
(74) *Attorney, Agent, or Firm* — Paratus Law Group, PLLC

(57) ABSTRACT

A power supply circuit includes a first and second circuits connected to a first and second phase windings of a rotary electric machine, respectively. The first circuit includes first to fourth arms and a first switch. The midpoints of the first and second arms are connected to respective ends of a first winding unit, the midpoints of the third and fourth arms are connected to respective ends of a second winding unit, and the first switch is connected between the midpoints of the second and third arms. The second circuit includes fifth to eighth arms and a second switch. The midpoints of fifth and sixth arms are connected to respective ends of a third winding unit, the midpoints of seventh and eighth arms are connected to respective ends of a fourth winding unit, and the second switch is connected between the midpoints of the sixth and seventh arm.

15 Claims, 12 Drawing Sheets

FIG. 2

| MODE | FIRST MODE (LOW ROTATION SPEED) | SECOND MODE (HIGH ROTATION SPEED) |
|---|---|---|
| TURN NUMBER | 2 | 1 |
| ELECTRIC CIRCUIT | | |
| SWITCH | sw1a, sw1b ⇒ ON | sw1a, sw1b ⇒ OFF |

FIG. 7

$\alpha1, \beta1 = 4T \quad \alpha3, \beta3 = 10T \quad \alpha2, \beta2 = 4T$

| MODE | ELEVENTH MODE (LOW ROTATION SPEED) | TWELFTH MODE (MEDIUM ROTATION SPEED) | THIRTEENTH MODE (MEDIUM AND HIGH ROTATION SPEED) | FOURTEENTH MODE (HIGH ROTATION SPEED) |
|---|---|---|---|---|
| TURN NUMBER | 18T | 14T | 10T | 4T 2para |
| ELECTRIC CIRCUIT | | | | |
| SWITCH | sw1a, sw1b ⇌ ON<br>sw2a, sw2b ⇌ ON<br>sw3a, sw3b ⇌ ON | sw1a, sw1b ⇌ ON<br>sw2a, sw2b ⇌ ON<br>sw3a, sw3b ⇌ OFF | sw1a, sw1b ⇌ ON<br>sw2a, sw2b ⇌ OFF<br>sw3a, sw3b ⇌ OFF | sw1a, sw1b ⇌ OFF<br>sw2a, sw2b ⇌ ON<br>sw3a, sw3b ⇌ ON |

POWER SUPPLY CIRCUIT AND ROTARY ELECTRIC MACHINE SYSTEM

CROSS REFERENCE TO RELATED APPLICATIONS

This application claims priority to Japanese Patent Applications No. 2021-153634 filed on Sep. 21, 2021 and No. 2022-030056 filed on Feb. 28, 2022, the contents of which are incorporated herein by reference.

TECHNICAL FIELD

The present invention relates to a power supply circuit and a rotary electric machine system.

BACKGROUND ART

In recent years, as a specific measure against global climate change, efforts toward implementation of a low-carbon society or a decarbonized society have become active. Also in vehicles, a reduction in a $CO_2$ emission is strongly required, and a drive source is rapidly electrified.

A rotary electric machine used as a drive source of a vehicle is required to be able to be driven with high efficiency over a wide range from a low speed region to a high speed region. Therefore, it is conceivable to mount two or more rotary electric machines having different characteristics as the drive source, but this causes an increase in manufacturing cost.

On the other hand, JP 2011-244576 A discloses a drive device for an induction motor configured to be switchable between a state in which a main winding and an auxiliary winding are connected in series and a state in which the main winding and the auxiliary winding are connected in parallel.

A power supply device capable of driving a rotary electric machine with higher efficiency is expected by imparting two or more characteristics to one rotary electric machine or imparting a developability to the rotary electric machine such that the difference in characteristics becomes large.

An object of the present invention is to provide a power supply circuit and a rotary electric machine system capable of imparting different characteristics to a rotary electric machine.

SUMMARY OF INVENTION

According to an aspect of the present invention, there is provided a power supply circuit configured to supply electric power to a rotary electric machine including a first phase winding and a second phase winding, the first phase winding including a first winding unit and a second winding unit and the second phase winding including a third winding unit and a fourth winding unit, the power supply circuit including: a first circuit that is connectable to a power supply and is connected to the first phase winding; and a second circuit that is connectable to the power supply in parallel with the first circuit and is connected to the second phase winding. The first circuit includes: first to fourth arms in each of which an upper arm provided with a switching element and a lower arm provided with a switching element are connected at a midpoint of each arm; and a first switch. The midpoint of the first arm is connected to one end of the first winding unit, the midpoint of the second arm is connected to another end of the first winding unit, the midpoint of the third arm is connected to one end of the second winding unit, the midpoint of the fourth arm is connected to another end of the second winding unit, and the first switch is connected between the midpoint of the second arm and the midpoint of the third arm. The second circuit includes: fifth to eighth arms in each of which an upper arm provided with a switching element and a lower arm provided with a switching element are connected at a midpoint of each arm; and a second switch. The midpoint of the fifth arm is connected to one end of the third winding unit, the midpoint of the sixth arm is connected to another end of the third winding unit, the midpoint of the seventh arm is connected to one end of the fourth winding unit, the midpoint of the eighth arm is connected to another end of the fourth winding unit, and the second switch is connected between the midpoint of the sixth arm and the midpoint of the seventh arm.

According to another aspect of the present invention, there is provided a rotary electric machine system including: a rotary electric machine including a first phase winding and a second phase winding; and a power supply circuit configured to supply electric power to the rotary electric machine. The first phase winding includes a first winding unit and a second winding unit, and the second phase winding includes a third winding unit and a fourth winding unit. The power supply circuit includes: a first circuit that is connected to a power supply and is connected to the first phase winding; and a second circuit that is connected to the power supply in parallel with the first circuit and is connected to the second phase winding. The first circuit includes: first to fourth arms in each of which an upper arm provided with a switching element and a lower arm provided with a switching element are connected at a midpoint of each arm; and a first switch. The midpoint of the first arm is connected to one end of the first winding unit, the midpoint of the second arm is connected to another end of the first winding unit, the midpoint of the third arm is connected to one end of the second winding unit, the midpoint of the fourth arm is connected to another end of the second winding unit, and the first switch is connected between the midpoint of the second arm and the midpoint of the third arm. The second circuit includes: fifth to eighth arms in each of which an upper arm provided with a switching element and a lower arm provided with a switching element are connected at a midpoint of each arm; and a second switch. The midpoint of the fifth arm is connected to one end of the third winding unit, the midpoint of the sixth arm is connected to another end of the third winding unit, the midpoint of the seventh arm is connected to one end of the fourth winding unit, the midpoint of the eighth arm is connected to another end of the fourth winding unit, and the second switch is connected between the midpoint of the sixth arm and the midpoint of the seventh arm.

BRIEF DESCRIPTION OF DRAWINGS

FIG. 2 is an operation explanatory diagram showing two modes of the rotary electric machine system of FIG. 1.

FIG. 7 is an operation explanatory diagram showing four modes of the rotary electric machine system of FIG. 6.

DESCRIPTION OF EMBODIMENTS

First, a first embodiment of the present invention will be described with reference to FIGS. 1 to 5.

(Rotary Electric Machine System)

Figure 1:
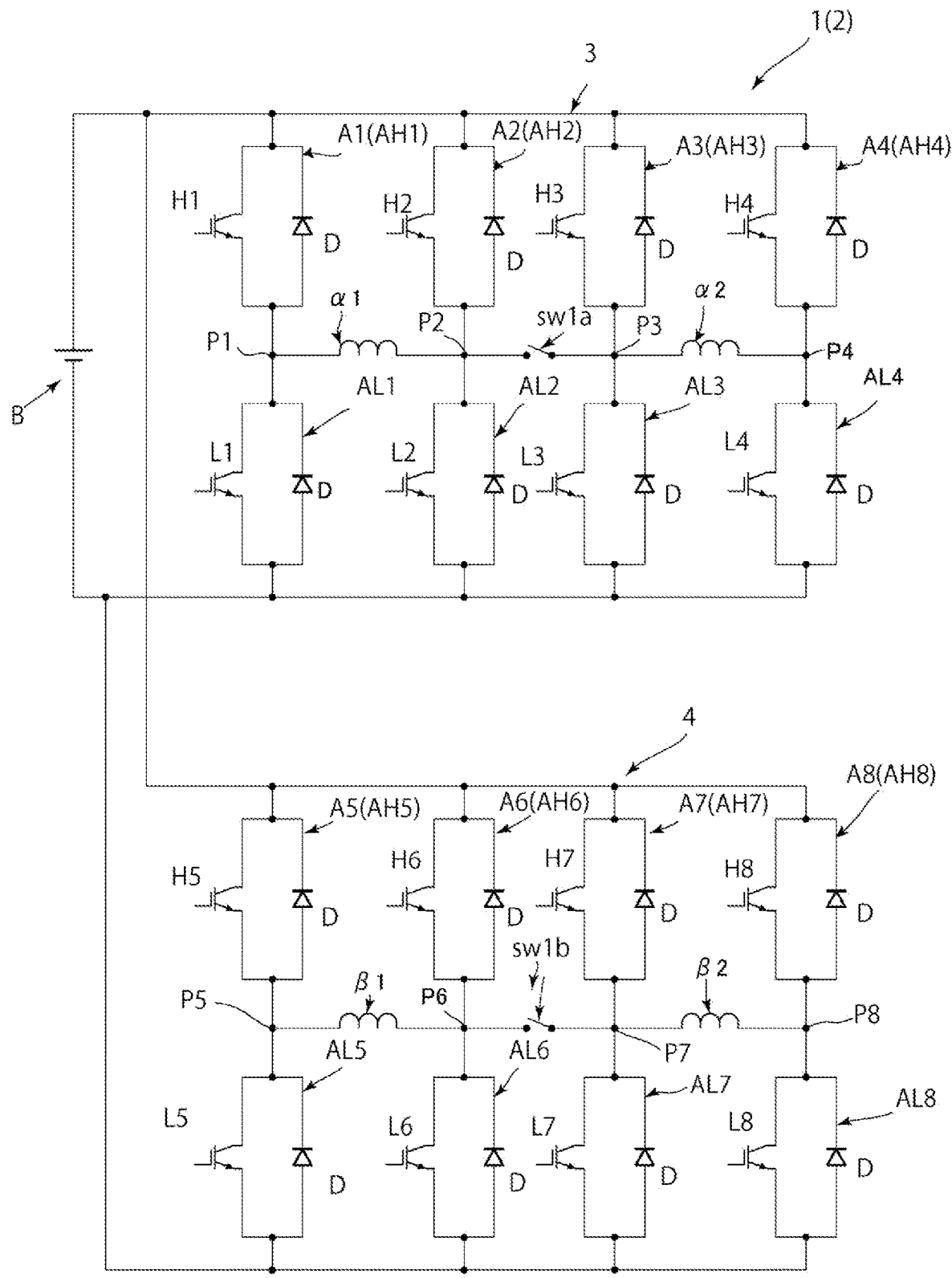
FIG. 1 is a circuit diagram showing a configuration of a rotary electric machine system according to a first embodiment.

As shown in FIG. 1, a rotary electric machine system 1 includes a rotary electric machine M (see FIG. 4) and a power supply circuit 2 that supplies electric power to the rotary electric machine.

(Rotary Electric Machine)

Figure 4:
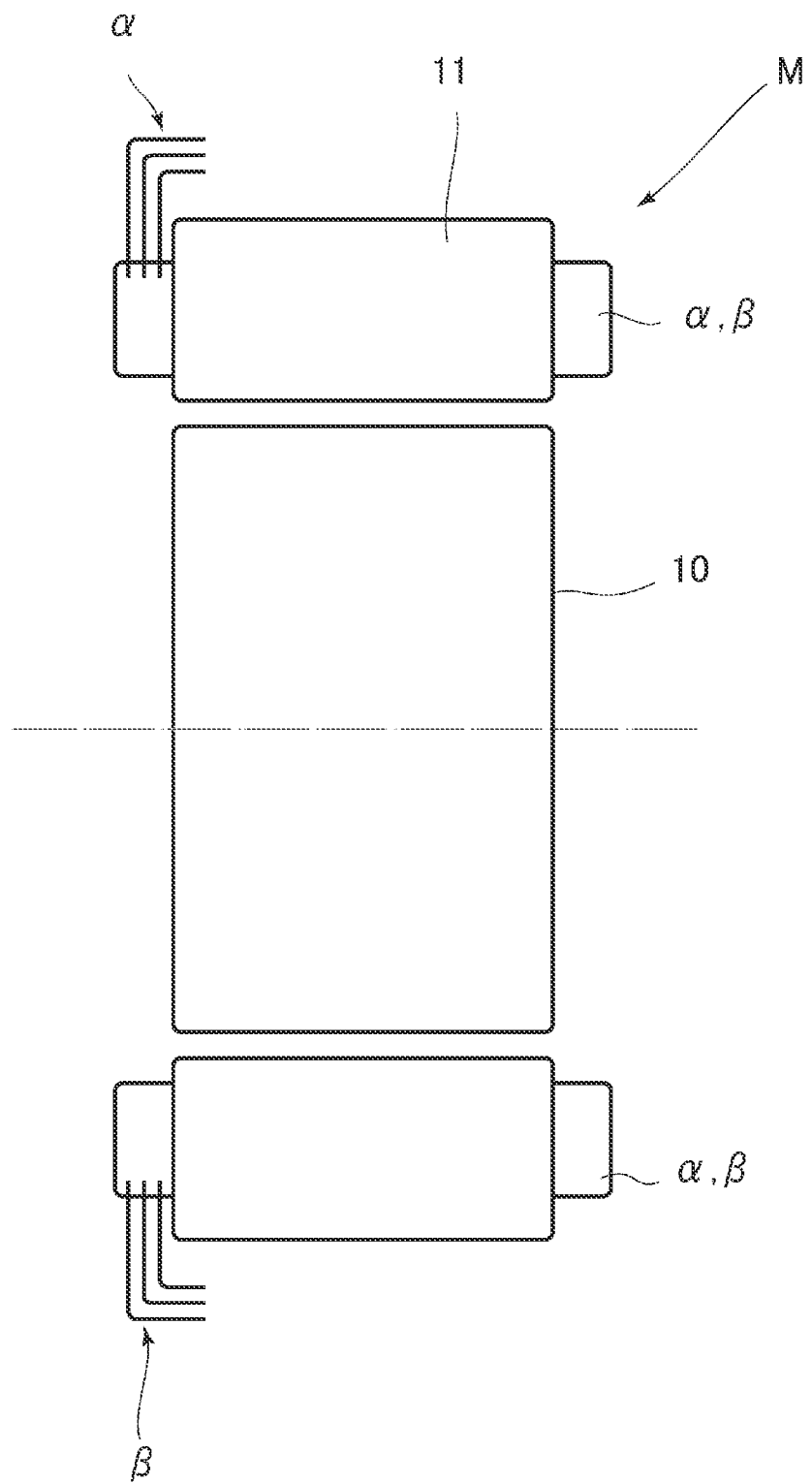
FIG. 4 is a schematic diagram of a rotary electric machine.

As shown in FIG. 4, the rotary electric machine M is a two-phase rotary electric machine including a rotor 10, a stator 11, and a first phase winding and a second phase winding β wound around the stator 11, and is implemented by, for example, a two-phase brushless motor. The first phase winding and the second phase winding β are disposed, for example, on the stator 11 with an electrical angle shifted by 90°. The winding arrangement will be described later. The first phase winding α includes a first winding unit α1 and a second winding unit α2, and the second phase winding β includes a third winding unit β1 and a fourth winding unit β2. The number of turns (also referred to as the turn number in the drawing) of the first winding unit α1 is equal to the number of turns of the second winding unit α2, and the number of turns of the third winding unit β1 is equal to the number of turns of the fourth winding unit β2. The number of turns of the first winding unit α1 is equal to the number of turns of the third winding unit β1, and the number of turns of the second winding unit α2 is equal to the number of turns of the fourth winding unit β2.

(Power Supply Circuit)

The power supply circuit 2 includes a first circuit 3 that is connected to a power supply B and is connected to the first phase winding α, and a second circuit 4 that is connected to the power supply B in parallel with the first circuit 3 and is connected to the second phase winding β.

The first circuit 3 includes first to fourth arms A1 to A4 and a first bidirectional switch sw1a. The first to fourth arms A1 to A4 are connected in parallel to the power supply B.

The first arm A1 includes an upper arm AH1, in which a switching element H1 and a free wheeling diode D are provided in parallel, and a lower arm AL1, in which a switching element L1 and a free wheeling diode D are provided in parallel, the lower arm AL1 being connected in series with the upper arm AH1 via a midpoint P1. The second arm A2 includes an upper arm AH2, in which a switching element H2 and a free wheeling diode D are provided in parallel, and a lower arm AL2, in which a switching element L2 and a free wheeling diode D are provided in parallel, the lower arm AL2 being connected in series with the upper arm AH2 via a midpoint P2. The third arm A3 includes an upper arm AH3, in which a switching element H3 and a free wheeling diode D are provided in parallel, and a lower arm AL3, in which a switching element L3 and a free wheeling diode D are provided in parallel, the lower arm AL3 being connected in series with the upper arm AH3 via a midpoint P3. The fourth arm A4 includes an upper arm AH4, in which a switching element H4 and a free wheeling diode D are provided in parallel, and a lower arm AL4, in which a switching element L4 and a free wheeling diode D are provided in parallel, the lower arm AL4 being connected in series with the upper arm AH4 via a midpoint P4.

One end of the first winding unit α1 is connected to the midpoint P1 of the first arm A1, the other end of the first winding unit α1 is connected to the midpoint P2 of the second arm A2. One end of the second winding unit α2 is connected to the midpoint P3 of the third arm A3, and the other end of the second winding unit α2 is connected to the midpoint P4 of the fourth arm A4.

For example, the first bidirectional switch sw1a is configured such that two sets of circuits each including a switching element and a diode in parallel are connected in series in opposite directions (forward directions of the diodes are connected to each other), and a bidirectional current flow can be switched between an ON state and an OFF state based on switching control of the two sets of switching elements. The first bidirectional switch sw1a is connected between the midpoint P2 of the second arm A2 and the midpoint P3 of the third arm A3.

The second circuit 4 includes fifth to eighth arms A5 to A8 and a second bidirectional switch sw1b. The fifth to eighth arms A5 to A8 of the second circuit 4 are connected in parallel to the power supply B.

The fifth arm A5 includes an upper arm AH5, in which a switching element H5 and a free wheeling diode D are provided in parallel, and a lower arm AL5, in which a switching element L5 and a free wheeling diode D are provided in parallel, the lower arm AL5 being connected in series with the upper arm AH5 via a midpoint P5. The sixth arm A6 includes an upper arm AH6, in which a switching element H6 and a free wheeling diode D are provided in parallel, and a lower arm AL6, in which a switching element L6 and a free wheeling diode D are provided in parallel, the lower arm AL6 being connected in series with the upper arm AH6 via a midpoint P6. The seventh arm A7 includes an upper arm AH7, in which a switching element H7 and a free wheeling diode D are provided in parallel, and a lower arm AL7, in which a switching element L7 and a free wheeling diode D are provided in parallel, the lower arm AL7 being connected in series with the upper arm AH7 via a midpoint P7. The eighth arm A8 includes an upper arm AH8, in which a switching element H8 and a free wheeling diode D are provided in parallel, and a lower arm AL8, in which a switching element L8 and a free wheeling diode D are provided in parallel, the lower arm AL8 being connected in series with the upper arm AH8 via a midpoint P8.

One end of the third winding unit β1 is connected to the midpoint P5 of the fifth arm A5, the other end of the third winding unit β1 is connected to the midpoint P6 of the sixth arm A6. One end of the fourth winding unit β2 is connected to the midpoint P7 of the seventh arm A7, and the other end of the fourth winding unit β2 is connected to the midpoint P8 of the eighth arm A8.

The second bidirectional switch sw1b has the same configuration as the first bidirectional switch sw1a, and is connected between the midpoint P6 of the sixth arm A6 and the midpoint P7 of the seventh arm A7.

Next, an example of the winding arrangement of the rotary electric machine M will be described.

Figure 11:
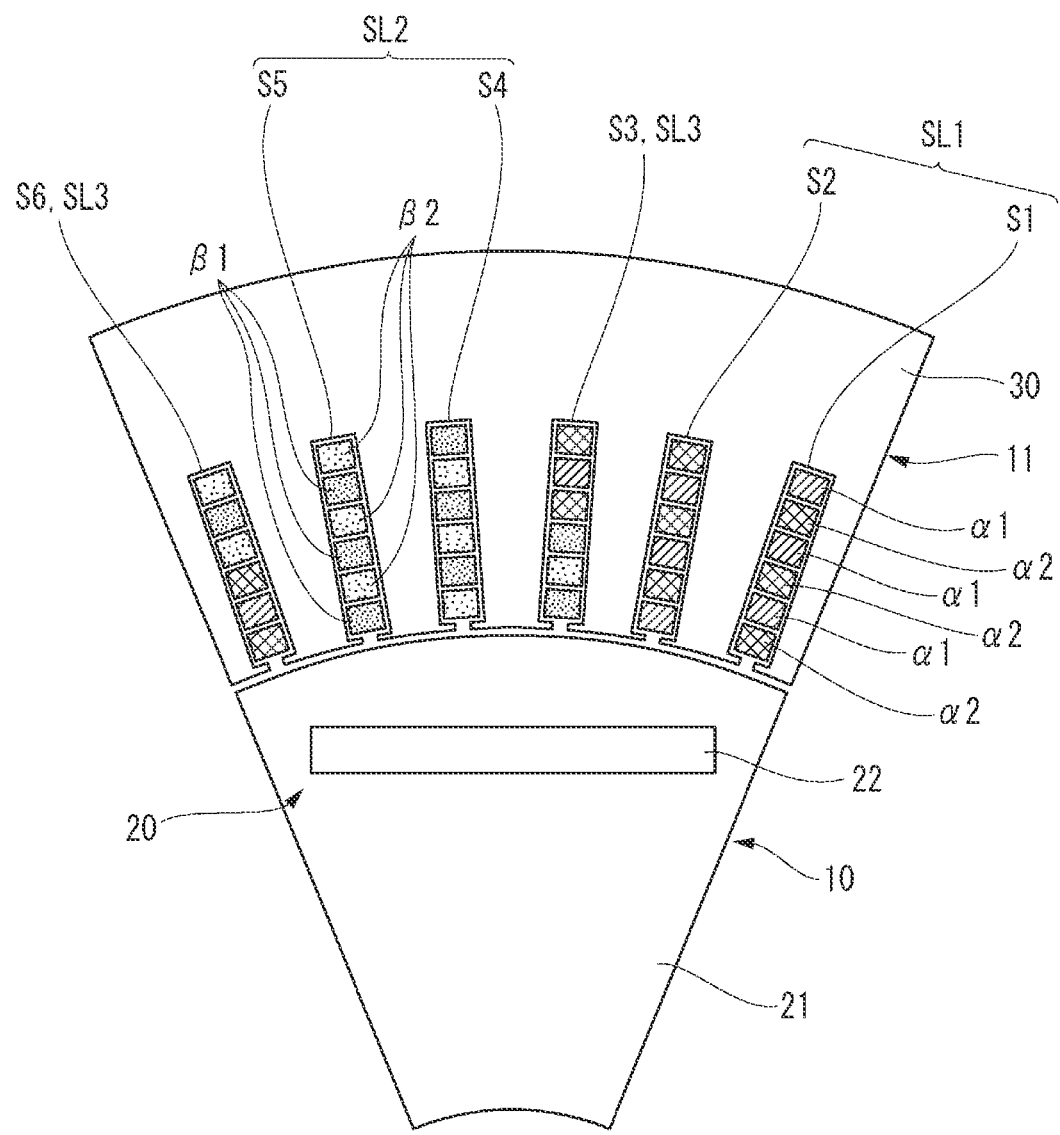
FIG. 11 is a diagram showing an example of a winding arrangement of a rotary electric machine M.
Figure 12:
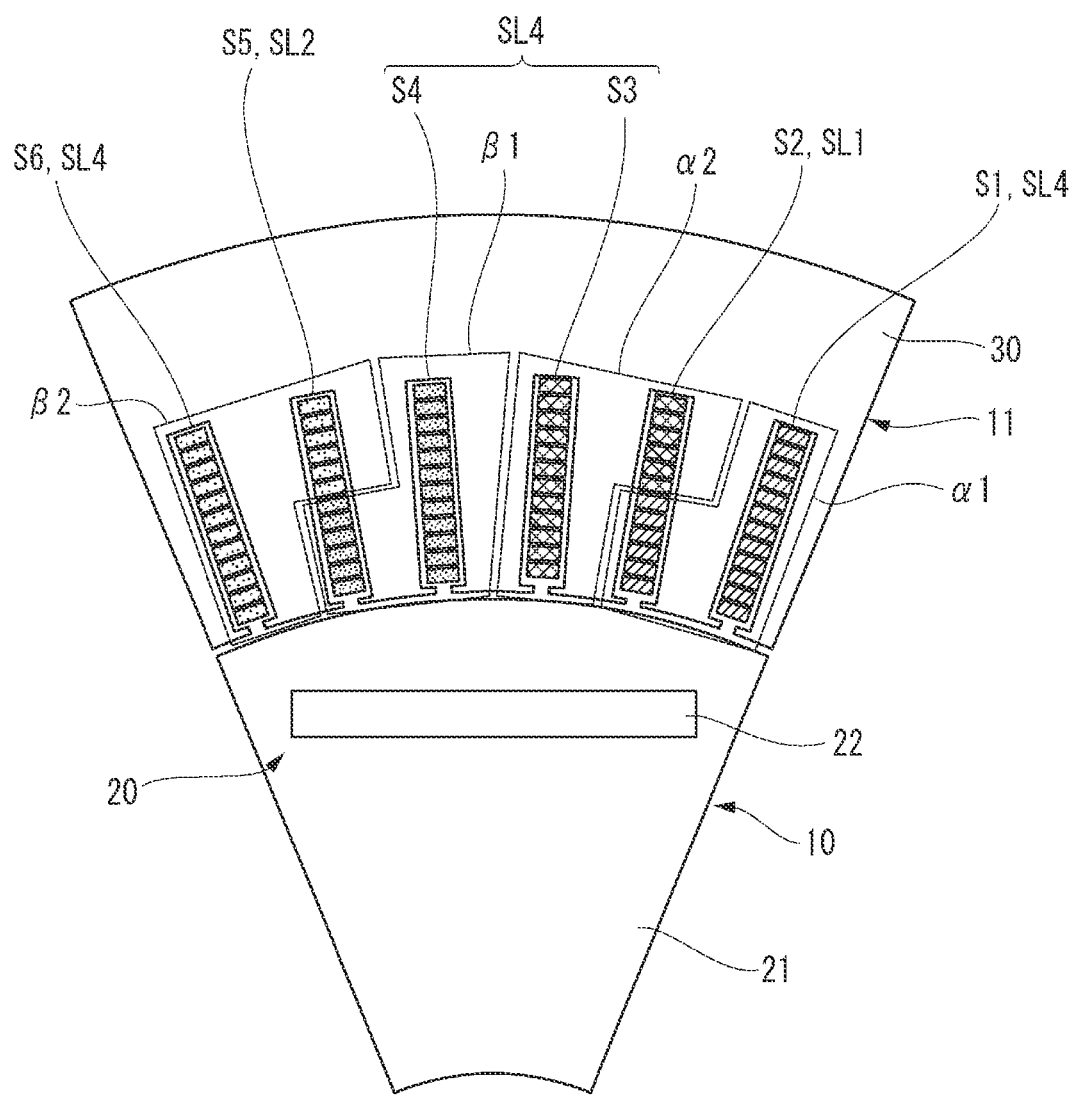
FIG. 12 is a diagram showing another example of the winding arrangement of the rotary electric machine M.

FIG. 11 is a diagram showing the example of the winding arrangement of the rotary electric machine M, and FIG. 12 is a diagram showing another example of the winding arrangement of the rotary electric machine M. The rotary electric machine M is, for example, a two-phase rotary electric machine having 8 poles and 48 slots.

The rotor 10 is provided with eight magnetic pole units 20 at equal intervals in a circumferential direction. Each of the magnetic pole units 20 is implemented by a permanent magnet 22 provided on a radially outer side of a rotor core 21. The stator 11 is provided with 48 slots at equal intervals in the circumferential direction on a radially inner side of a stator core 30. That is, the interval between adjacent slots is 30° in electrical angle. In FIGS. 11 and 12, only one magnetic pole unit 20 and six slots corresponding to the one magnetic pole unit 20 are shown. In the following description, in FIGS. 11 and 12, the six slots are referred to as a No. 1 slot S1, a No. 2 slot S2, a No. 3 slot S3, a No. 4 slot S4, a No. 5 slot S5, and a No. 6 slot S6 from the right side to the left side in the circumferential direction.

In the example of FIG. 11, six windings (coils) are disposed in each slot. In the No. 1 slot S1 and the No. 2 slot S2, the first winding units α1 and the second winding units α2 of the first phase winding α are alternately disposed in a radial direction, respectively. In the No. 4 slot S4 and the No. 5 slot S5, the third winding units β1 and the fourth winding units β2 of the second phase winding β are alternately disposed in the radial direction, respectively. In addition, in the No. 3 slot S3 and the No. 6 slot S6, the first winding units α1 and the second winding units α2 of the first phase winding α are alternately disposed in the radial direction, and the third winding units α1 and the fourth winding units α2 of the second phase winding β are alternately disposed in the radial direction.

As described above, on the stator 11, the first phase winding α (the first winding unit α1 and the second winding unit α2) and the second phase winding β (the third winding unit β1 and the fourth winding unit β2) are disposed with an electrical angle shifted by 90°.

Here, when a slot in which the first winding units α1 and the second winding units α2 of the first phase winding α are disposed is referred to as a first slot SL1, the No. 1 slot S1 and the No. 2 slot S2 constitute the first slot SL1. When a slot in which the third winding units β1 and the fourth winding units β2 of the second phase winding β are disposed is referred to as a second slot SL2, the No. 4 slot S4 and the No. 5 slot S5 constitute the second slot SL2. When a slot in which all of the first winding units α1 and the second winding units α2 of the first phase winding α and the third winding units β1 and the fourth winding units 12 of the second phase winding β are disposed is referred to as a third slot SL3, the No. 3 slot S3 and the No. 6 slot S6 constitute the third slot SL3.

In the example of FIG. 11, the third slot SL3 is disposed between the first slot SL1 and the second slot SL2.

In the example of FIG. 12, twelve windings (coils) are disposed in each slot. Only the first winding unit α1 of the first phase winding α is disposed in the No. 1 slot S1, only the second winding unit α2 of the first phase winding α is disposed in the No. 3 slot S3, and the first winding unit α1 and the second winding unit α2 of the first phase winding α are disposed in the No. 2 slot S2, which is disposed between the No. 1 slot S1 and the No. 3 slot S3, so as to be divided into two in the radial direction. That is, the first winding unit α1 and the second winding unit α2 are disposed with an electrical angle shifted by 45°. In addition, only the third winding unit β1 of the second phase winding β is disposed in the No. 4 slot S4, only the fourth winding unit β2 of the second phase winding β is disposed in the No. 6 slot S6, and the third winding unit β1 and the fourth winding unit β2 of the second phase winding β are disposed in the No. 5 slot S5, which is disposed between the No. 4 slot S4 and the No. 6 slot S6, so as to be divided into two in the radial direction. That is, the third winding unit β1 and the fourth winding unit β2 are disposed with an electrical angle shifted by 45°.

As described above, on the stator 11, the first phase winding α (the first winding unit α1 and the second winding unit α2) and the second phase winding β (the third winding unit β1 and the fourth winding unit β2) are disposed with an electrical angle shifted by 90°.

Similarly to the example of FIG. 11, when a slot in which the first winding unit α1 and the second winding unit α2 of the first phase winding α are disposed is referred to as the first slot SL1, the No. 2 slot S2 constitutes the first slot SL1. When a slot in which the third winding unit β1 and the fourth winding unit β2 of the second phase winding β are disposed is referred to as the second slot SL2, the No. 5 slot S5 constitutes the second slot SL2. In addition, when a slot, in which only one winding unit is disposed and which is not in the example of FIG. 11, is referred to as a fourth slot SL4, the No. 1 slot S1, the No. 3 slot S3, the No. 4 slot S4, and the No. 6 slot S6 constitute the fourth slot SL4.

In the example of FIG. 12, two fourth slots SL4 are disposed between the first slot SL1 and the second slot SL2. In the example shown in FIG. 12, since the winding units are disposed with an electrical angle shifted by 45°, although in a two-phase motor, the effect of improving a maximum torque and the effect of reducing a torque ripple can be obtained by improving a winding coefficient.

According to the rotary electric machine system 1 configured as described above, the rotary electric machine M can be operated in two modes having different characteristics. Hereinafter, two switchable modes will be described with reference to FIG. 2.

(First Mode)

As shown on the left side of FIG. 2, in a first mode, the first bidirectional switch sw1a and the second bidirectional switch sw1b are turned on, and based on switching control of the first arm A1, the fourth arm A4, the fifth arm A5, and the eighth arm A8, electric power is supplied to the first winding unit α1 and the second winding unit α2 of the first phase winding α connected in series and supplied to the third winding unit β1 and the fourth winding unit β2 of the second phase winding β connected in series (in FIG. 2, the turn number is described as 2). In the first mode, as shown in the left side of FIG. 5, a torque performance in a low rotation speed region can be improved.

Figure 5:
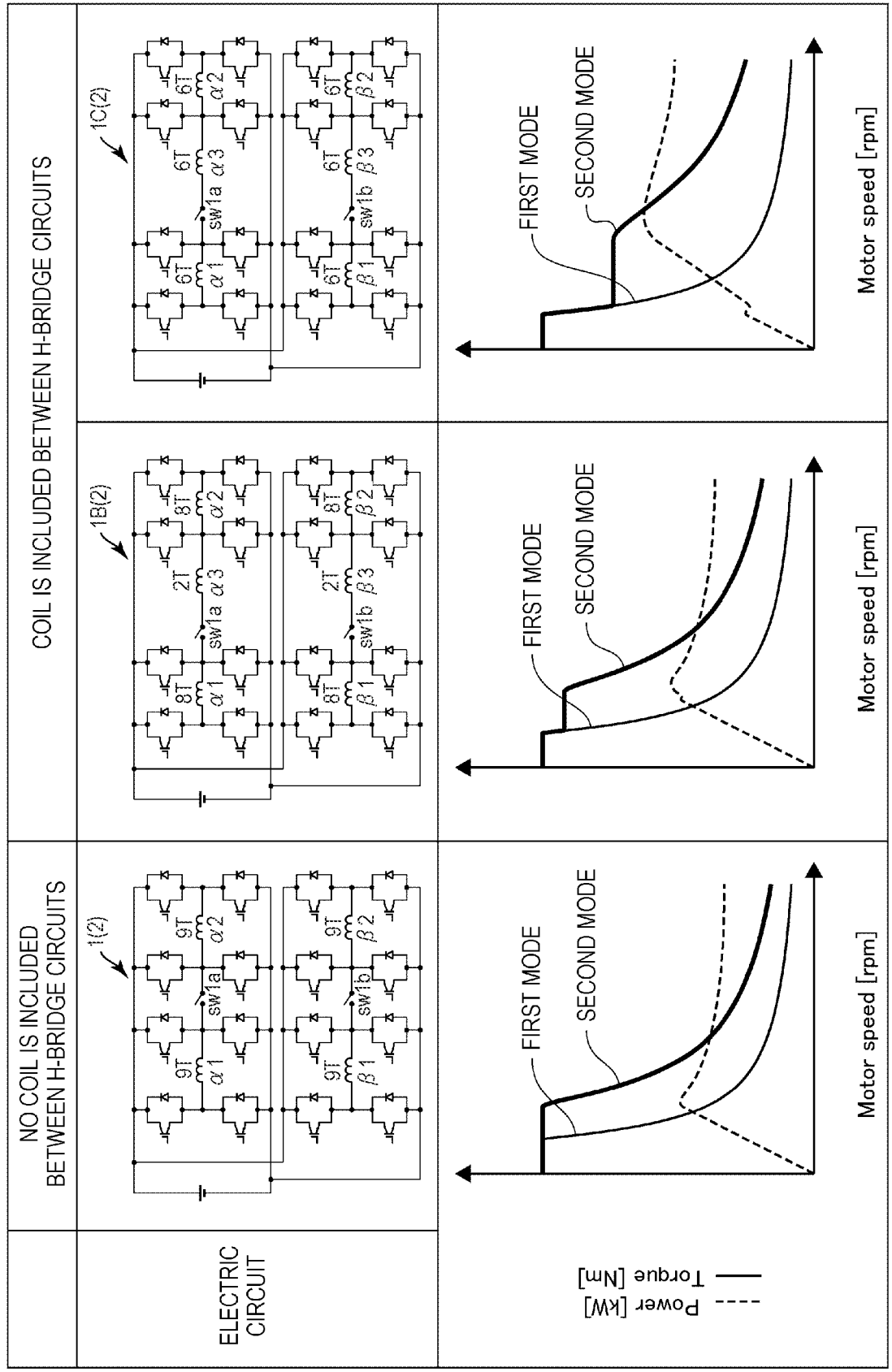
FIG. 5 is an explanatory diagram comparing configurations and performances of the rotary electric machine systems according to the first to third embodiments.

In the example shown in the left side of FIG. 5, in the first embodiment, when the number of turns (the turn number) of the winding of each phase is 18 (18T in the drawing), the number of turns of the first winding unit α1 and the number of turns of the second winding unit α2 are 9 (9T in the drawing), and the number of turns of the third winding unit β1 and the number of turns of the fourth winding unit β2 are 9 (9T in the drawing).

(Second Mode)

As shown on the right side of FIG. 2, in a second mode, the first bidirectional switch sw1a and the second bidirectional switch sw1b are turned off, and based on switching control of the first to eighth arms A1 to A8, electric power is supplied to the first winding unit α1 and the second winding unit α2 of the first phase winding α connected in parallel and supplied to the third winding unit β1 and the fourth winding unit β2 of the second phase winding β connected in parallel (in FIG. 2, the turn number is described as 1). In the second mode, as shown in the left side of FIG. 5, an output performance in a high rotation speed region can be improved. Accordingly, by selecting the first mode in the low rotation speed region and selecting the second mode in the high rotation speed region, both the torque performance and the output performance can be achieved.

(Switching from First Mode to Second Mode)

Figure 3:
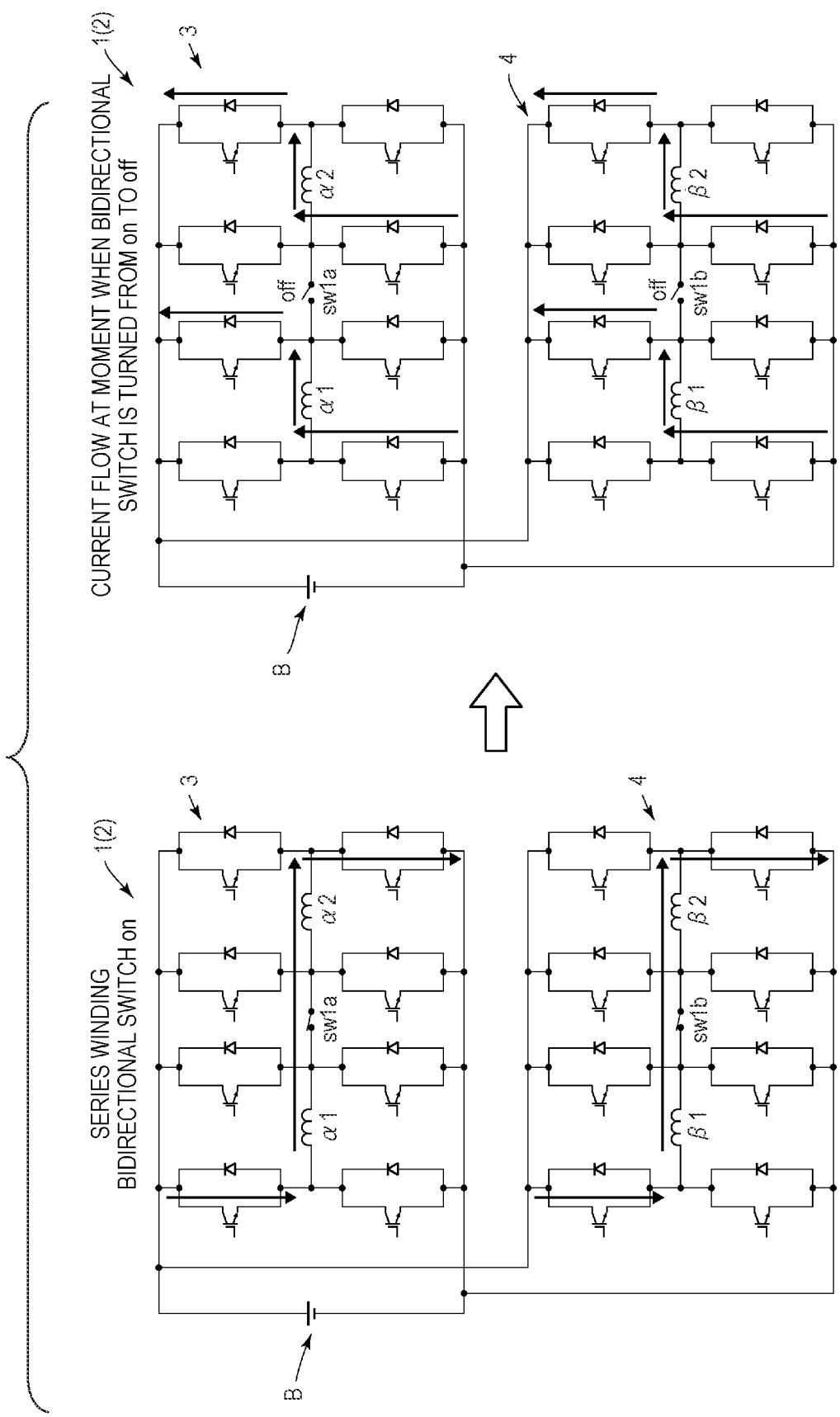
FIG. 3 is a circuit diagram showing a current flow when a bidirectional switch of the rotary electric machine system of FIG. 1 is switched to an OFF state.

As shown in FIG. 3, when the mode is shifted from the first mode to the second mode, based on the switching from the ON state of the first bidirectional switch sw1a and the second bidirectional switch sw1b to the OFF state of the first bidirectional switch sw1a and the second bidirectional switch sw1b, charges (energy) stored in the winding units α1, α2, β1, and β2 are discharged. Specifically, in the power supply circuit 2 of the present embodiment, as shown in the right side of FIG. 3, a current flowing through each of the winding units α1, α2, β1, and β2 flows through the free wheeling diode D of each of the arms A1 to A8. As described above, since paths for releasing the currents of the winding units α1, α2, β1, and β2 are secured, it is possible to prevent the switching elements H1 to H8, L1 to L8, and the like from being damaged by the currents discharged from the winding units α1, α2, β1, and β2.

OTHER EMBODIMENTS

Next, rotary electric machine systems 1B to 1E according to second to fifth embodiments will be described with reference to FIGS. 5 to 10. However, the same reference numerals as those of the first embodiment are used for configurations common to those of the first embodiment, and the description of the first embodiment may be incorporated.

Second and Third Embodiments

As shown in the center in the left-right direction and the right side of FIG. 5, the rotary electric machine systems 1B and 1C of the second and third embodiments are different from those of the first embodiment in that a fifth winding unit α3 of the first phase winding α is provided between the first bidirectional switch sw1a and the midpoint P3 of the third arm A3 (or between the midpoint P2 of the second arm A2 and the first bidirectional switch sw1a), and a sixth winding unit β3 of the second phase winding β is provided between the second bidirectional switch sw1b and the midpoint P7 of the seventh arm A7 (or between the midpoint P6 of the sixth arm A6 and the second bidirectional switch sw1b). The number of turns of the fifth winding unit α3 is equal to the number of turns of the sixth winding unit β3. According to the second and third embodiments, as shown in the lower part of FIG. 5, the characteristics of the rotary electric machine M can be greatly changed in the case where electric power is supplied to the three winding units α1 to α3 and β1 to β3 connected in series (first mode) and the case where electric power is supplied to the two winding units α1, α2, β1, and β2 connected in parallel (second mode), so that the output efficiency can be further improved.

In the second embodiment, the number of turns of the fifth winding unit α3 is less than the number of turns of the first winding unit α1 and the number of turns of the second winding unit α2, and the number of turns of the sixth winding unit β3 is less than the number of turns of the third winding unit β1 and the number of turns of the fourth winding unit β2. In the example shown in the center in the left-right direction of FIG. 5, when the number of turns (the turn number) of the winding of each phase is 18 (18T in the drawing), the number of turns of the fifth winding unit α3 is 2 (2T in the drawing), the number of turns of the first winding unit α1 and the number of turns of the second winding unit α2 are 8 (8T in the drawing), the number of turns of the sixth winding unit β3 is 2 (2T in the drawing), and the number of turns of the third winding unit β1 and the number of turns of the fourth winding unit β2 are 8 (8T in the drawing).

In the third embodiment, the number of turns of the fifth winding unit α3 is the same as the number of turns of the first winding unit α1 and the number of turns of the second winding unit α2, and the number of turns of the sixth winding unit β3 is the same as the number of turns of the third winding unit β1 and the number of turns of the fourth winding unit β2. In the example shown in the right side of FIG. 5, when the number of turns (the turn number) of the winding of each phase is 18 (18T in the drawing), the number of turns of the fifth winding unit α3, the number of turns of the first winding unit α1, and the number of turns of the second winding unit α2 are 6 (6T in the drawing), and the number of turns of the sixth winding unit β3, the number of turns of the third winding unit β1, and the number of turns of the fourth winding unit β2 are 6 (6T in the drawing).

In the second and third embodiments, the power supply circuit 2 is switchable between the first mode and the second mode. In the first mode, the first bidirectional switch sw1a and the second bidirectional switch sw1b are turned on and electric power is supplied to the first winding unit α1, the second winding unit α2, and the fifth winding unit α3 of the first phase winding α connected in series and supplied to the third winding unit β1, the fourth winding unit β2, and the sixth winding unit β3 of the second phase winding pi connected in series. In the second mode, the first bidirectional switch sw1a and the second bidirectional switch sw1b are turned off and electric power is supplied to the first winding unit α1 and the second winding unit α2 of the first phase winding α connected in parallel and supplied to the third winding unit β1 and the fourth winding unit β2 of the second phase winding β connected in parallel.

In the second and third embodiments, it is preferable that the first circuit 3 and the second circuit 4 are provided with charge release units that release charges (energy) of the fifth winding unit α3 and the sixth winding unit β3 when the power supply circuit 2 is switched from the first mode to the second mode. The charge release unit is, for example, a charge release circuit that is connected to both end sides of the fifth winding unit α3 and the sixth winding unit β3 and releases the charges (energy) of the fifth winding unit α3 and the sixth winding unit β3 in conjunction with switching of the first bidirectional switch sw1a and the second bidirectional switch sw1b from the ON state to the OFF state. According to such the charge release unit, when the power supply circuit 2 is switched from the first mode to the second mode, generation of a surge current can be prevented by releasing the charges (energy) of the fifth winding unit α3 and the sixth winding unit β3.

In addition, instead of providing the charge release unit, when the power supply circuit 2 is switched from the first mode to the second mode, a period, in which the switching elements H1 to H4 and L1 to L4 of the first to fourth arms A1 to A4 and the switching elements H5 to H8 and L5 to L8 of the fifth to eighth arms A5 to A8 are controlled to be in the OFF state, may be provided. Accordingly, when the power supply circuit 2 is switched from the first mode to the second mode, during the OFF period of each of the switching elements H1 to H8 and L1 to L8, the current from the fifth winding unit 3 and the sixth winding unit β3 flows through the free wheeling diode D of each of the arms A1 to A8, and thus it is possible to release the charges (energy) of the fifth winding unit α3 and the sixth winding unit β3 without separately providing a charge release circuit.

Fourth Embodiment

Figure 6:
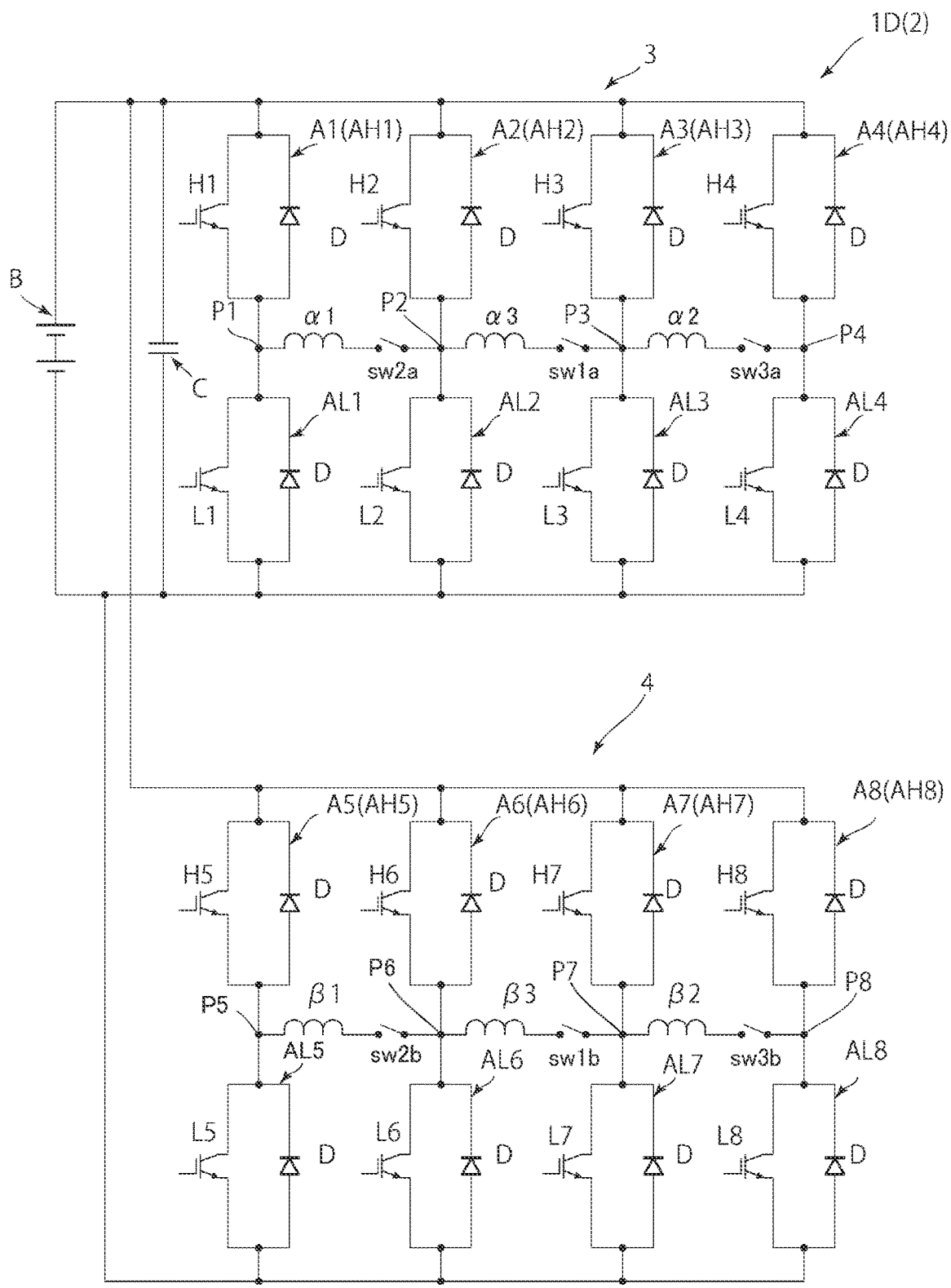
FIG. 6 is a circuit diagram showing a configuration of a rotary electric machine system according to a fourth embodiment.
Figure 8:
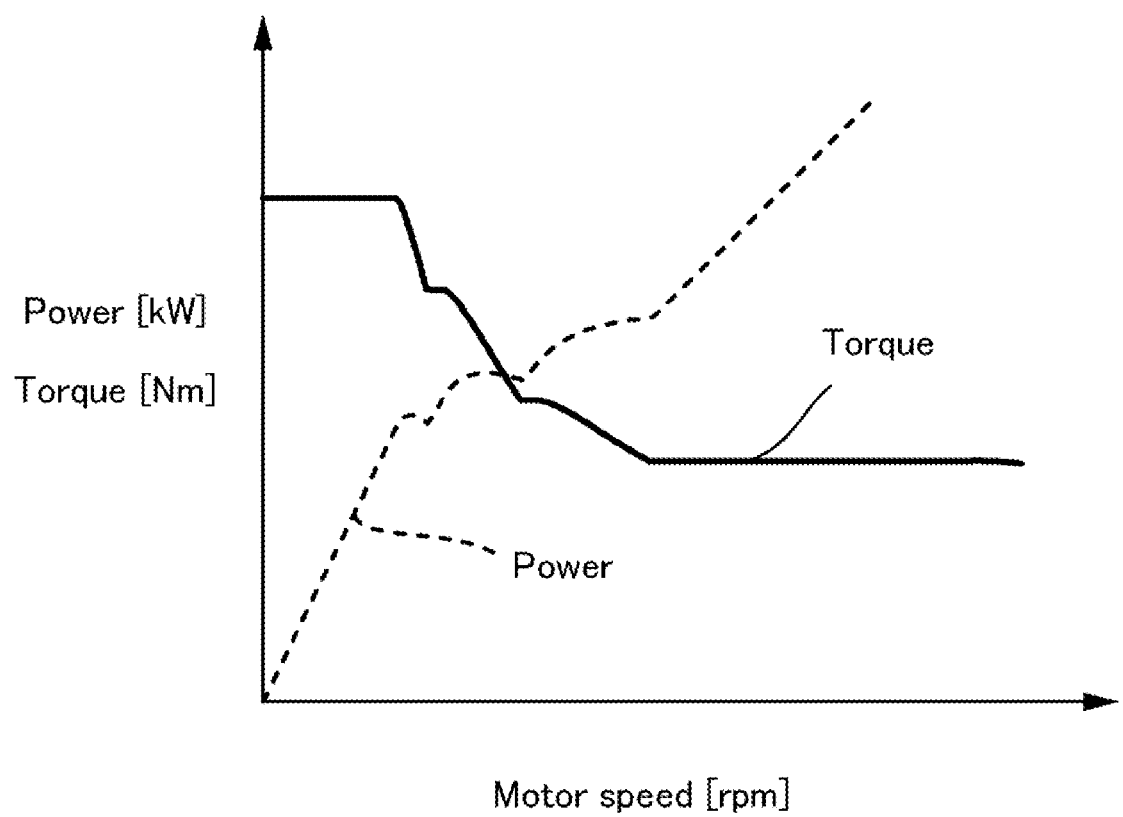
FIG. 8 is a graph showing a torque performance and an output performance of the rotary electric machine system of FIG. 6.

As shown in FIG. 6, the rotary electric machine system 1D of the fourth embodiment is different from those of the second and third embodiments in that the rotary electric machine system 1D further includes a third bidirectional switch sw2a provided between the first winding unit α1 of the first phase winding α and the midpoint P2 of the second arm A2 (or between the first winding unit α1 of the first phase winding α and the midpoint P1 of the first arm A1), a fourth bidirectional switch sw2b provided between the third winding unit β1 of the second phase winding β and the midpoint P6 of the sixth arm A6 (or between the third winding unit β1 of the second phase winding β and the midpoint P5 of the fifth arm A5), a fifth bidirectional switch sw3a provided between the second winding unit α2 of the first phase winding α and the midpoint P4 of the fourth arm A4 (or between the second winding unit α2 of the first phase winding α and the midpoint P3 of the third arm A3), and a sixth bidirectional switch sw3b provided between the fourth winding unit β2 of the second phase winding β and the midpoint P8 of the eighth arm A8 (or between the fourth winding unit β2 of the second phase winding β and the midpoint P7 of the seventh arm A7).

According to the fourth embodiment, four modes (eleventh mode to fourteenth mode) as shown in FIG. 7 can be implemented. In the example shown in FIG. 7, when the number of turns (the turn number) of the winding of each phase is 18 (18T in the drawing), the number of turns of the fifth winding unit α3 is 10 (10T in the drawing), the number of turns of the first winding unit α1 and the number of turns of the second winding unit α2 are 4 (4T in the drawing), the number of turns of the sixth winding unit β3 is 10 (10T in the drawing), and the number of turns of the third winding unit β1 and the number of turns of the fourth winding unit β2 are 4 (4T in the drawing).

Eleventh Mode

As shown in the left end of FIG. 7, in the eleventh mode, the first bidirectional switch sw1a, the second bidirectional switch sw1b, the third bidirectional switch sw2a, the fourth bidirectional switch sw2b, the fifth bidirectional switch sw3a, and the sixth bidirectional switch sw3b are turned on, and based on switching control of the first arm A1, the seventh arm A7, the fourth arm A4, and the eighth arm A8, electric power is supplied to the first winding unit α1, the fifth winding unit 3, and the second winding unit α2 of the first phase winding α and the third winding unit β1, the sixth winding unit β3, and the fourth winding unit β2 of the second phase winding β, which are connected in series. That is, the number of turns (the turn number) of the winding of each phase to which electric power is supplied is 18 (18T in the drawing).

Twelfth Mode

As shown in the second column from the left end in FIG. 7, in the twelfth mode, the first bidirectional switch sw1a, the second bidirectional switch sw1b, the third bidirectional switch sw2a, and the fourth bidirectional switch sw2b are turned on, the fifth bidirectional switch sw3a and the sixth bidirectional switch sw3b are turned off, and based on switching control of the first arm A1, the third arm A3, the fifth arm A5, and the seventh arm A7, electric power is supplied to the first winding unit α1 and the fifth winding unit α3 of the first phase winding α connected in series and to the third winding unit β1 and the sixth winding unit β3 of the second phase winding β connected in series. That is, the number of turns (the turn number) of the winding of each phase to which electric power is supplied is 14 (14T in the drawing).

Thirteenth Mode

As shown in the third column from the left end of FIG. 7, in the thirteenth mode, the first bidirectional switch sw1a and the second bidirectional switch sw1b are turned on, the third bidirectional switch sw2a, the fourth bidirectional switch sw2b, the fifth bidirectional switch sw3a, and the sixth bidirectional switch sw3b are turned off, and based on switching control of the second arm A2, the third arm A3, the sixth arm A6, and the seventh arm A7, electric power is supplied to the fifth winding unit α3 of the first phase winding α and the sixth winding unit β3 of the second phase winding β. That is, the number of turns (the turn number) of the winding of each phase to which electric power is supplied is 10 (10T in the drawing).

Fourteenth Mode

As shown in the right side of FIG. 7, in the fourteenth mode, the third bidirectional switch sw2a, the fourth bidirectional switch sw2b, the fifth bidirectional switch sw3a, and the sixth bidirectional switch sw3b are turned on, the first bidirectional switch sw1a and the second bidirectional switch sw1b are turned off, and based on switching control of the first to eighth arms A1 to A8, electric power is supplied to the first winding unit α1 and the second winding unit α2 of the first phase winding α connected in parallel and to the third winding unit β1 and the fourth winding unit β2 of the second phase winding β connected in parallel. In this case, two circuits having the number of turns (the turn number) of four to which electric power is supplied are present in parallel in the winding of each phase (4T 2para in the drawing).

According to the fourth embodiment as described above, as shown in FIG. 8, since more characteristics can be imparted to the rotary electric machine M as compared with the first to third embodiments, the output efficiency can be further improved.

(Modification of Fourth Embodiment)

Figure 9:
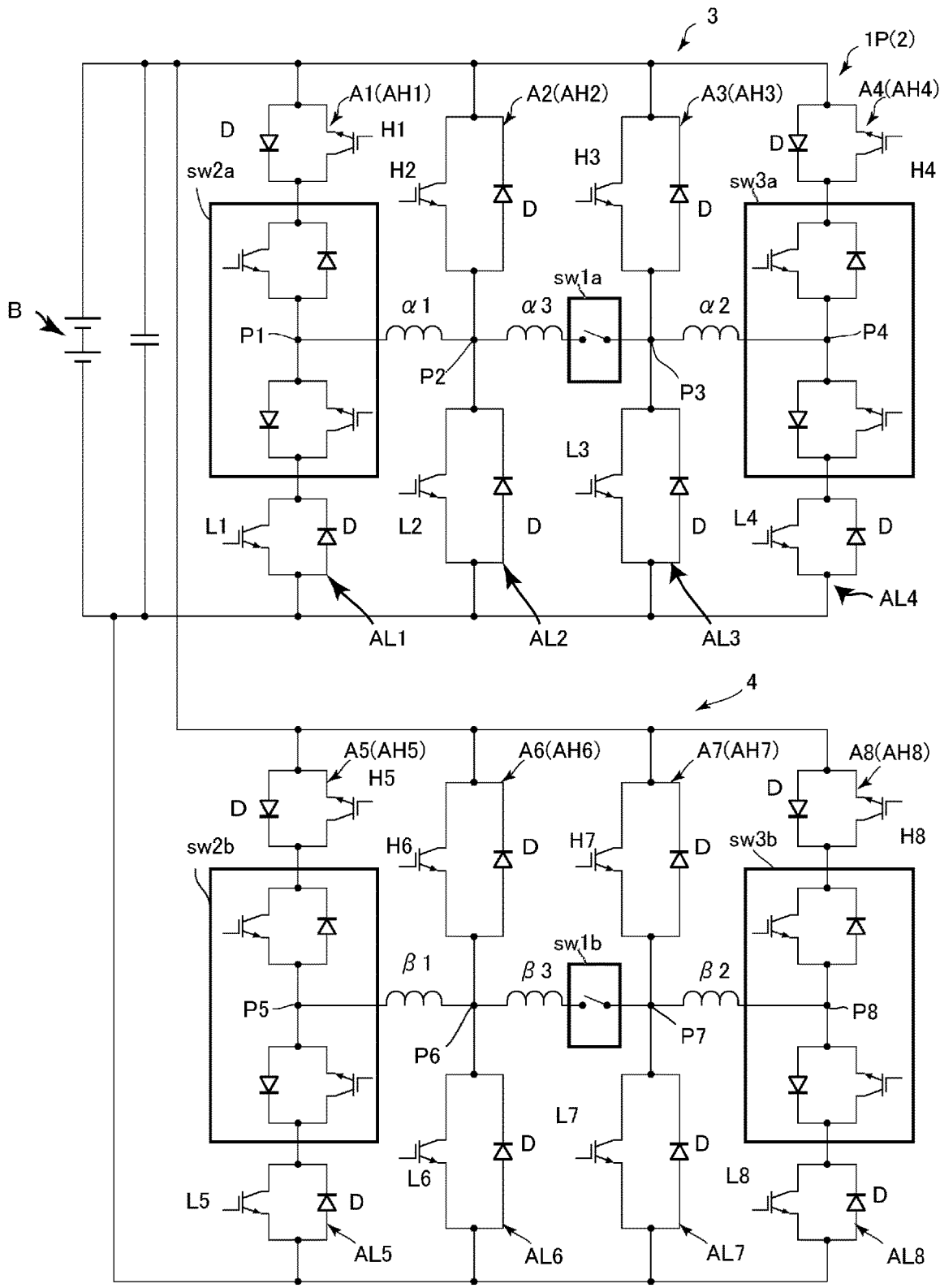
FIG. 9 is a circuit diagram showing a modification of the rotary electric machine system of FIG. 6.

FIG. 9 shows a modification of the fourth embodiment, in which the third bidirectional switch sw2a is provided between the switching element H1 of the upper arm AH1 and the switching element L1 of the lower arm AL1 of the first arm A1, and the fourth bidirectional switch sw2b is provided between the switching element H5 of the upper arm AH5 and the switching element L5 of the lower arm AL5 of the fifth arm A5. In addition, the fifth bidirectional switch sw3a is provided between the switching element H4 of the upper arm AH4 and the switching element L4 of the lower arm AL4 of the fourth arm A4, and the sixth bidirectional switch sw3b is provided between the switching element H8 of the upper arm AH8 and the switching element L8 of the lower arm AL8 of the eighth arm A8. With such a configuration of the modification, four modes can be implemented similarly to the fourth embodiment described above.

Fifth Embodiment

Figure 10:
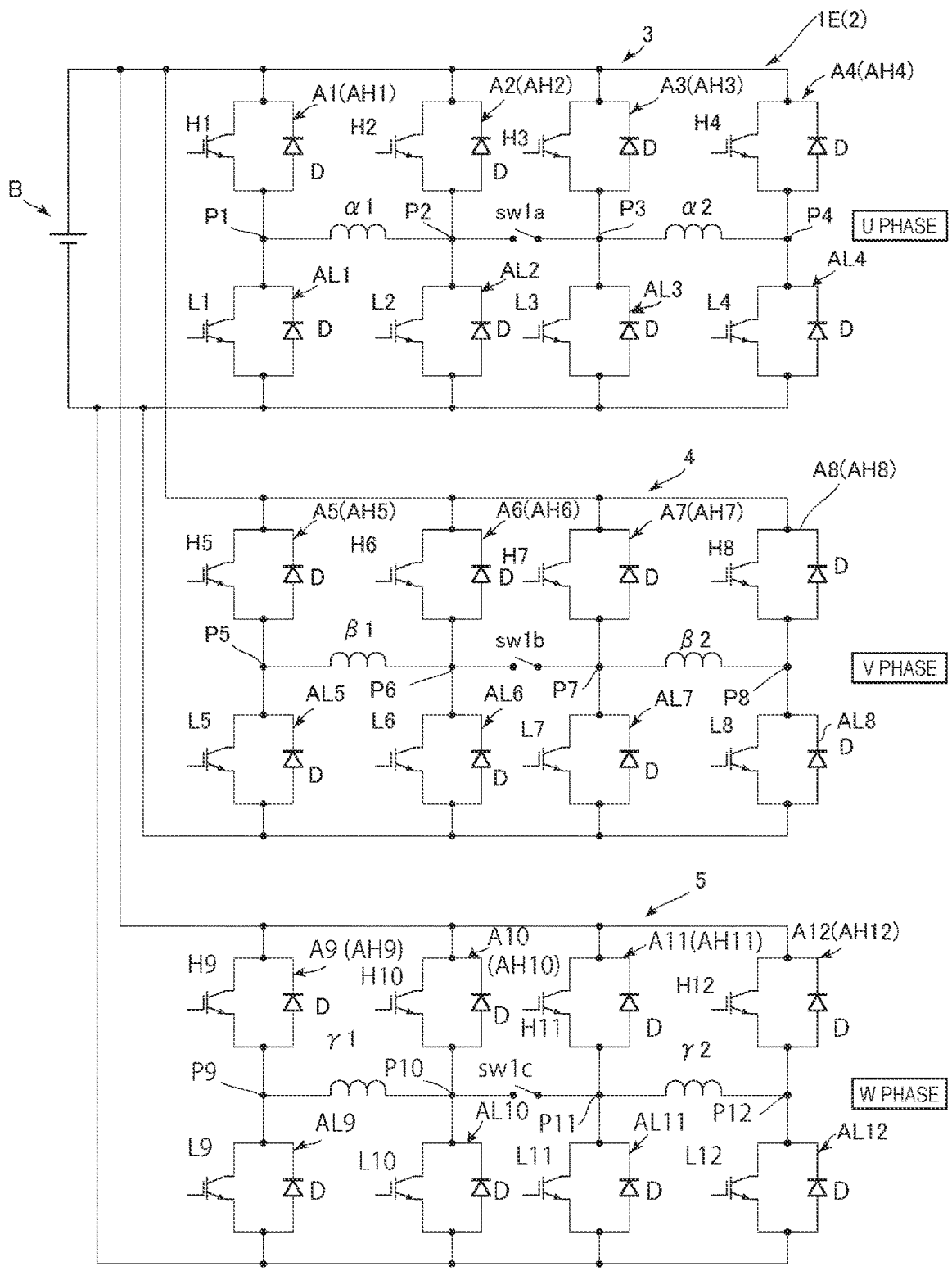
FIG. 10 is a circuit diagram showing a configuration of a rotary electric machine system according to a fifth embodiment.

The rotary electric machine system 1E of the fifth embodiment shown in FIG. 10 is different from the first to fourth embodiments in that the rotary electric machine system 1E is applied to a three-phase rotary electric machine.

As shown in FIG. 10, the power supply circuit 2 of the fifth embodiment supplies electric power to the rotary electric machine M, which includes the first phase (U phase) winding α including the first winding unit α1 and the second winding unit α2, the second phase (V phase) winding β including the third winding unit β1 and the fourth winding unit β2, and a third phase (W phase) winding γ including a seventh winding unit γ1 and an eighth winding unit γ2.

The power supply circuit 2 includes a third circuit 5 in addition to the first circuit 3 and the second circuit 4 described above. The third circuit 5 is connected to the power supply B in parallel with the first circuit 3 and the second circuit 4, and is connected to the third phase winding γ.

The third circuit 5 includes ninth to twelfth arms A9 to A12 and a seventh bidirectional switch sw1c. The ninth to twelfth arms A9 to A12 of the third circuit 5 are connected in parallel to the power supply B.

The ninth arm A9 includes an upper arm AH9, in which a switching element H9 and a free wheeling diode D are provided in parallel, and a lower arm AL9, in which a switching element L9 and a free wheeling diode D are provided in parallel, the lower arm AL9 being connected in series with the upper arm AH9 via a midpoint P9. The tenth arm A10 includes an upper arm AH10, in which a switching element H10 and a free wheeling diode D are provided in parallel, and a lower arm AL10, in which a switching element L10 and a free wheeling diode D are provided in parallel, the lower arm AL10 being connected in series with the upper arm AH10 via a midpoint P10. The eleventh arm A11 includes an upper arm AH11, in which a switching element H11 and a free wheeling diode D are provided in parallel, and a lower arm AL11, in which a switching element L11 and a free wheeling diode D are provided in parallel, the lower arm AL11 being connected in series with the upper arm AH11 via a midpoint P11. The twelfth arm A12 includes an upper arm AH12, in which a switching element H12 and a free wheeling diode D are provided in parallel, and a lower arm AL12, in which a switching element L12 and a free wheeling diode D are provided in parallel, the lower arm AL12 being connected in series with the upper arm AH12 via a midpoint P12.

One end of the seventh winding unit γ1 is connected to the midpoint P9 of the ninth arm A9, the other end of the seventh winding unit γ1 is connected to the midpoint P10 of the tenth arm A10. One end of the eighth winding unit γ2 is connected to the midpoint P11 of the eleventh arm A11, and the other end of the eighth winding unit γ2 is connected to the midpoint P12 of the twelfth arm A12.

The seventh bidirectional switch sw1c has the same configuration as the first bidirectional switch sw1a and the like, and is connected between the midpoint P10 of the tenth arm A10 and the midpoint P11 of the eleventh arm A11.

According to the fifth embodiment, even in the three-phase rotary electric machine, when electric power is supplied to the windings α, β, and γ of the respective phases, the rotary electric machine M can have different characteristics by switching between a case where electric power is supplied to two winding units connected in series and a case where electric power is supplied to two winding units connected in parallel. Accordingly, an efficient operating point can be selected, and thus output efficiency can be improved.

In addition, in the fifth embodiment, as in the second and third embodiments, a winding unit may be provided in series with the bidirectional switches sw1a, sw1b, and sw1c. Further, also in the fifth embodiment, as in the fourth embodiment, a bidirectional switch may be provided between each winding unit and the midpoint.

Although various embodiments have been described above with reference to the drawings, it is needless to say that the present invention is not limited to these examples. It is apparent to those skilled in the art that various changes and modifications can be conceived within the scope of the claims, and it is also understood that such variations and modifications belong to the technical scope of the present invention. In addition, constituent elements in the embodiments described above may be combined freely within a range not departing from the spirit of the present invention.

For example, the bidirectional switch may be a contactor mechanical switch, a reverse blocking IGBT, and the like as long as the bidirectional switch is capable of blocking the flow of the bidirectional current.

The present specification describes at least the following matters. Although the corresponding constituent elements and the like in the above embodiment are shown in parentheses, the present invention is not limited thereto.

(1) A power supply circuit (power supply circuit 2) configured to supply electric power to a rotary electric machine (rotary electric machine M) including a first phase winding (first phase winding α) and a second phase winding, the first phase winding including a first winding unit (first winding unit α1) and a second winding unit (second winding unit α2), and the second phase winding (second phase winding β) including a third winding unit (third winding unit β1) and a fourth winding unit (fourth winding unit β2), the power supply circuit including:

a first circuit (first circuit 3) that is connectable to a power supply (power supply B) and is connected to the first phase winding; and a second circuit (second circuit 4) that is connectable to the power supply in parallel with the first circuit and is connected to the second phase winding, in which the first circuit includes: first to fourth arms (first to fourth arms A1 to A4) in each of which an upper arm (upper arms AH1 to AH4) provided with a switching element (switching elements H1 to H4) and a lower arm (AL1 to AL4) provided with a switching element (switching elements L1 to L4) are connected at a midpoint (midpoints P1 to P4) of each arm; and a first switch (first bidirectional switch sw1a).

the midpoint of the first arm is connected to one end of the first winding unit, the midpoint of the second arm is connected to another end of the first winding unit, the midpoint of the third arm is connected to one end of the second winding unit, the midpoint of the fourth arm is connected to another end of the second winding unit, the first switch is connected between the midpoint of the second arm and the midpoint of the third arm, the second circuit includes: fifth to eighth arms (fifth to eighth arms A5 to A8) in each of which an upper arm (upper arms AH5 to AH8) provided with a switching element (switching elements H5 to H8) and a lower arm (lower arms AL5 to AL8) provided with a switching element (switching elements L5 to L8) are connected at a midpoint (midpoints P5 to P8) of each arm; and a second switch (second bidirectional switch sw1$b$), the midpoint of the fifth arm is connected to one end of the third winding unit, the midpoint of the sixth arm is connected to another end of the third winding unit, the midpoint of the seventh arm is connected to one end of the fourth winding unit, the midpoint of the eighth arm is connected to another end of the fourth winding unit, and the second switch is connected between the midpoint of the sixth arm and the midpoint of the seventh arm.

According to (1), in a multi-phase rotary electric machine, when electric power is supplied to the windings of the respective phases, the rotary electric machine can have different characteristics by switching between a case where electric power is supplied to two winding units connected in series and a case where electric power is supplied to two winding units connected in parallel. Accordingly, an efficient operating point can be selected, and thus output efficiency can be improved.

(2) The power supply circuit according to (1), in which the power supply circuit is switchable between a first mode and a second mode, in which the first mode is a mode in which the first switch and the second switch are turned on and electric power is supplied to the first winding unit and the second winding unit of the first phase winding connected in series and supplied to the third winding unit and the fourth winding unit of the second phase winding connected in series, and the second mode is a mode in which the first switch and the second switch are turned off and electric power is supplied to the first winding unit and the second winding unit of the first phase winding connected in parallel and supplied to the third winding unit and the fourth winding unit of the second phase winding connected in parallel.

According to (2), by selecting the first mode in a low rotation speed region and selecting the second mode in a high rotation speed region, it is possible to achieve both a torque density and an output density.

(3) The power supply circuit according to (2), in which the first to fourth arms include free wheeling diodes (free wheeling diode D) each of which is provided in parallel with the corresponding switching element, and when the power supply circuit is switched from the first mode to the second mode, a current flowing through the first winding unit and the second winding unit of the first phase winding flows through the free wheeling diodes.

According to (3), it is possible to prevent the switching elements and the like from being damaged by the currents discharged from the first winding unit and the second winding unit.

(4) The power supply circuit according to (2) or (3), in which the fifth to eighth arms include free wheeling diodes (free wheeling diode D) each of which is provided in parallel with the corresponding switching element, and when the power supply circuit is switched from the first mode to the second mode, a current flowing through the third winding unit and the fourth winding unit of the second phase winding flows through the free wheeling diodes.

According to (4), it is possible to prevent the switching elements and the like from being damaged by the currents discharged from the third winding unit and the fourth winding unit.

(5) The power supply circuit according to any one of (1) to (4), in which a fifth winding unit (fifth winding unit α3) of the first phase winding is provided between the midpoint of the second arm and the first switch or between the first switch and the midpoint of the third arm, and a sixth winding unit (sixth winding unit β3) of the second phase winding is provided between the midpoint of the sixth arm and the second switch or between the second switch and the midpoint of the seventh arm.

According to (5), the characteristics of the rotary electric machine can be greatly changed in a case where electric power is supplied to three winding units connected in series and a case where electric power is supplied to two winding units connected in parallel, and the output efficiency can be further improved.

(6) The power supply circuit according to (5), in which the number of turns of the first winding unit is equal to the number of turns of the second winding unit, the number of turns of the fifth winding unit is equal to or larger than the number of turns of the first winding unit and the number of turns of the second winding unit, the number of turns of the third winding unit is equal to the number of turns of the fourth winding unit, and the number of turns of the sixth winding unit is equal to or larger than the number of turns of the third winding unit and the number of turns of the fourth winding unit.

According to (6), a difference in the number of turns of the winding to which the electric power is supplied increases in a case where electric power is supplied to three winding units connected in series and a case where electric power is supplied to two winding units connected in parallel.

(7) The power supply circuit according to (5) or (6), in which the first to fourth arms include free wheeling diodes each of which is provided in parallel with the corresponding switching element, the fifth to eighth arms included free wheeling diodes each of which is provided in parallel with the corresponding switching element, the power supply circuit is switchable between a first mode and a second mode, in which the first mode is a mode in which the first switch and the second switch are turned on and electric power is supplied to the first winding unit, the second winding unit, and the fifth winding unit of the first phase winding connected in series and supplied to the third winding unit, the fourth winding unit, and the sixth winding unit of the second phase winding connected in series, and the second mode is a mode in which the first switch and the second switch are turned off and electric power is supplied to the first winding unit and the second winding unit of the first phase winding connected in parallel and supplied to the third winding unit and the fourth winding unit of the second phase winding connected in parallel, and when the power supply circuit is switched from the first mode to the second mode, a current flowing through the fifth winding unit flows through the free wheeling diodes of the first to fourth arms and a current flowing through the sixth winding unit flows through the free wheeling diodes of the fifth to eighth arms.

According to (7), in the first mode, since the number of turns of the winding to which the electric power is supplied is large, a torque is improved, an inductance is increased, a harmonic component of the current is reduced, and an iron loss is reduced. On the other hand, in the second mode, since the number of turns of the winding to which the electric power is supplied is small, magnetic flux is reduced so as to reduce a counter-electromotive force, and an output on a high rotation speed side can be improved. In addition, when the power supply circuit is switched from the first mode to the second mode, the current flowing through the fifth winding unit and the sixth winding unit flows through the free wheeling diodes, and thus it is possible to prevent generation of a surge current.

(8) The power supply circuit according to (7), in which when the power supply circuit is switched from the first mode to the second mode,
a period, in which the switching element of the first to fourth arms and the switching element of the fifth to eighth arms are controlled to be in an OFF state, is provided.

According to (8), when the power supply circuit is switched from the first mode to the second mode, during the OFF period of each switching element, the current from the fifth winding unit and the sixth winding unit flows through the free wheeling diodes, and thus it is possible to release charges (energy) of the fifth winding unit and the sixth winding unit.

(9) The power supply circuit according to any one of (1) to (4), in which
the rotary electric machine includes a stator (stator 11) and a rotor (rotor 10),
the stator includes a plurality of slots (slots S1 to S6) disposed side by side in a circumferential direction,
the plurality of slots include a first slot (first slot SL1) and a second slot (second slot SL2) that are disposed apart from each other in the circumferential direction,
the first winding unit and the second winding unit are disposed in the first slot, and
the third winding unit and the fourth winding unit are disposed in the second slot.

(10) The power supply circuit according to (9), in which the plurality of slots include a third slot (third slot SL3) disposed between the first slot and the second slot, and
the first winding unit, the second winding unit, the third winding unit, and the fourth winding unit are disposed in the third slot.

(11) The power supply circuit according to (9), in which the plurality of slots include a fourth slot (fourth slot SL4) disposed between the first slot and the second slot, and
only one of the first winding unit, the second winding unit, the third winding unit, and the fourth winding unit is disposed in the fourth slot.

(12) The power supply circuit according to (11), in which the first winding unit and the second winding unit are disposed with an electrical angle shifted by 45°, and
the third winding unit and the fourth winding unit are disposed with an electrical angle shifted by 45°.

According to (12), when electric power is supplied to two winding units connected in parallel, since the winding units are disposed with an electrical angle shifted by 45°, although in a two-phase motor, the effect of improving a maximum torque and the effect of reducing a torque ripple can be obtained by improving a winding coefficient.

(13) The power supply circuit according to any one of (9) to (12), in which
the first winding unit and the second winding unit, and the third winding unit and the fourth winding unit are disposed with an electrical angle shifted by 90°.

(14) The power supply circuit according to (1),
the rotary electric machine (rotary electric machine M) further including a third phase winding (third phase winding γ) which includes a seventh winding unit (seventh winding unit γ1) and an eighth winding unit (eighth winding unit γ2), the power supply circuit further including:
a third circuit (third circuit 5) that is connectable to the power supply in parallel with the first circuit and the second circuit and is connected to the third phase winding, in which
the third circuit includes: ninth to twelfth arms (ninth to twelfth arms A9 to A12) in each of which an upper arm (upper arms AH9 to AH12) provided with a switching element (switching elements H9 to H12) and a lower arm (lower arms AL9 to AL12) provided with a switching element (switching elements L9 to L12) are connected at a midpoint (midpoints P9 to P12) of each arm; and a third switch (seventh bidirectional switch sw1c),
the midpoint of the ninth arm is connected to one end of the seventh winding unit,
the midpoint of the tenth arm is connected to another end of the seventh winding unit,
the midpoint of the eleventh arm is connected to one end of the eighth winding unit,
the midpoint of the twelfth arm is connected to another end of the eighth winding unit, and
the third switch is connected between the midpoint of the tenth arm and the midpoint of the eleventh arm.

According to (14), in a three-phase rotary electric machine, when electric power is supplied to the windings of the respective phases, the rotary electric machine can have different characteristics by switching between a case where electric power is supplied to two winding units connected in series and a case where electric power is supplied to two winding units connected in parallel. Accordingly, an efficient operating point can be selected, and thus output efficiency can be improved.

(15) A rotary electric machine system (rotary electric machine system 1) including:
a rotary electric machine (rotary electric machine M) including a first phase winding (first phase winding α) and a second phase winding (second phase winding β); and
a power supply circuit (power supply circuit 2) configured to supply electric power to the rotary electric machine, in which
the first phase winding includes a first winding unit (first winding unit α1) and a second winding unit (second winding unit α2),
the second phase winding includes a third winding unit (third winding unit β1) and a fourth winding unit (fourth winding unit β2),
the power supply circuit includes
a first circuit (first circuit 3) that is connected to a power supply (power supply B) and is connected to the first phase winding, and
a second circuit (second circuit 4) that is connected to the power supply in parallel with the first circuit and is connected to the second phase winding,
the first circuit includes: first to fourth arms (first to fourth arms A1 to A4) in each of which an upper arm (upper arms AH1 to AH4) provided with a switching element (switching elements H1 to H4) and a lower arm (lower arms AL1 to AL4) provided with a switching element (switching elements L1 to L4) are connected at a midpoint (midpoints P1 to P4) of each arm; and a first switch (first bidirectional switch sw1a), the midpoint of the first arm is connected to one end of the first winding unit, the midpoint of the second arm is connected to another end of the first winding unit, the midpoint of the third arm is connected to one end of the second winding unit, the midpoint of the fourth arm is connected to another end of the second winding unit, the first switch is connected between the midpoint of the second arm and the midpoint of the third arm, the second circuit includes: fifth to eighth arms (fifth to eighth arms A5 to A8) in each of which an upper arm (upper arms AH5 to AH8) provided with a switching element (switching elements H5 to H8) and a lower arm (lower arms AL5 to AL8) provided with a switching element (switching elements L5 to L8) are connected at a midpoint (midpoints P5 to P8) of each arm; and a second switch (second bidirectional switch sw1b), the midpoint of the fifth arm is connected to one end of the third winding unit, the midpoint of the sixth arm is connected to another end of the third winding unit, the midpoint of the seventh arm is connected to one end of the fourth winding unit, the midpoint of the eighth arm is connected to another end of the fourth winding unit, and the second switch is connected between the midpoint of the sixth arm and the midpoint of the seventh arm.

According to (15), in a multi-phase rotary electric machine, when electric power is supplied to the windings of the respective phases, the rotary electric machine can have different characteristics by switching between a case where electric power is supplied to two winding units connected in series and a case where electric power is supplied to two winding units connected in parallel. Accordingly, an efficient operating point can be selected, and thus output efficiency can be improved.

What is claimed is:

1. A power supply circuit configured to supply electric power to a rotary electric machine including a first phase winding and a second phase winding, the first phase winding including a first winding unit and a second winding unit and the second phase winding including a third winding unit and a fourth winding unit, the power supply circuit comprising:
   a first circuit that is connectable to a power supply and is connected to the first phase winding; and
   a second circuit that is connectable to the power supply in parallel with the first circuit and is connected to the second phase winding, wherein
   the first circuit includes: first to fourth arms in each of which an upper arm provided with a switching element and a lower arm provided with a switching element are connected at a midpoint of each arm; and a first switch,
   the midpoint of the first arm is connected to one end of the first winding unit,
   the midpoint of the second arm is connected to another end of the first winding unit,
   the midpoint of the third arm is connected to one end of the second winding unit,
   the midpoint of the fourth arm is connected to another end of the second winding unit,
   the first switch is connected between the midpoint of the second arm and the midpoint of the third arm,
   the second circuit includes: fifth to eighth arms in each of which an upper arm provided with a switching element and a lower arm provided with a switching element are connected at a midpoint of each arm; and a second switch,
   the midpoint of the fifth arm is connected to one end of the third winding unit,
   the midpoint of the sixth arm is connected to another end of the third winding unit,
   the midpoint of the seventh arm is connected to one end of the fourth winding unit,
   the midpoint of the eighth arm is connected to another end of the fourth winding unit, and
   the second switch is connected between the midpoint of the sixth arm and the midpoint of the seventh arm.

2. The power supply circuit according to claim 1, wherein
   the power supply circuit is switchable between a first mode and a second mode, wherein
   the first mode is a mode in which the first switch and the second switch are turned on and electric power is supplied to the first winding unit and the second winding unit of the first phase winding connected in series and supplied to the third winding unit and the fourth winding unit of the second phase winding connected in series, and
   the second mode is a mode in which the first switch and the second switch are turned off and electric power is supplied to the first winding unit and the second winding unit of the first phase winding connected in parallel and supplied to the third winding unit and the fourth winding unit of the second phase winding connected in parallel.

3. The power supply circuit according to claim 2, wherein
   the first to fourth arms include free wheeling diodes each of which is provided in parallel with the corresponding switching element, and
   when the power supply circuit is switched from the first mode to the second mode, a current flowing through the first winding unit and the second winding unit of the first phase winding flows through the free wheeling diodes.

4. The power supply circuit according to claim 2, wherein
   the fifth to eighth arms include free wheeling diodes each of which is provided in parallel with the corresponding switching element, and
   when the power supply circuit is switched from the first mode to the second mode, a current flowing through the third winding unit and the fourth winding unit of the second phase winding flows through the free wheeling diode.

5. The power supply circuit according to claim 1, wherein
   a fifth winding unit of the first phase winding is provided between the midpoint of the second arm and the first switch or between the first switch and the midpoint of the third arm, and
   a sixth winding unit of the second phase winding is provided between the midpoint of the sixth arm and the second switch or between the second switch and the midpoint of the seventh arm.

6. The power supply circuit according to claim 5, wherein
   the number of turns of the first winding unit is equal to the number of turns of the second winding unit, the number of turns of the fifth winding unit is equal to or larger than the number of turns of the first winding unit and the number of turns of the second winding unit, the number of turns of the third winding unit is equal to the number of turns of the fourth winding unit, and the number of turns of the sixth winding unit is equal to or larger than the number of turns of the third winding unit and the number of turns of the fourth winding unit.

7. The power supply circuit according to claim 5, wherein the first to fourth arms include free wheeling diodes each of which is provided in parallel with the corresponding switching element of the first to fourth arms, the fifth to eighth arms include free wheeling diodes each of which is provided in parallel with the corresponding switching element of the fifth to eighth arms, the power supply circuit is switchable between a first mode and a second mode, wherein the first mode is a mode in which the first switch and the second switch are turned on and electric power is supplied to the first winding unit, the second winding unit, and the fifth winding unit of the first phase winding connected in series and supplied to the third winding unit, the fourth winding unit, and the sixth winding unit of the second phase winding connected in series, and the second mode is a mode in which the first switch and the second switch are turned off and electric power is supplied to the first winding unit and the second winding unit of the first phase winding connected in parallel and supplied to the third winding unit and the fourth winding unit of the second phase winding connected in parallel, and wherein when the power supply circuit is switched from the first mode to the second mode, a current flowing through the fifth winding unit flows through the free wheeling diodes of the first to fourth arms and a current flowing through the sixth winding unit flows through the free wheeling diodes of the fifth to eighth arms.

8. The power supply circuit according to claim 7, wherein when the power supply circuit is switched from the first mode to the second mode, a period, in which the switching element of the first to fourth arms and the switching element of the fifth to eighth arms are controlled to be in an OFF state, is provided.

9. The power supply circuit according to claim 1, wherein the rotary electric machine includes a stator and a rotor, the stator includes a plurality of slots disposed side by side in a circumferential direction, the plurality of slots include a first slot and a second slot that are disposed apart from each other in the circumferential direction, the first winding unit and the second winding unit are disposed in the first slot, and the third winding unit and the fourth winding unit are disposed in the second slot.

10. The power supply circuit according to claim 9, wherein the plurality of slots include a third slot disposed between the first slot and the second slot, and the first winding unit, the second winding unit, the third winding unit, and the fourth winding unit are disposed in the third slot.

11. The power supply circuit according to claim 9, wherein the plurality of slots include a fourth slot disposed between the first slot and the second slot, and only one of the first winding unit, the second winding unit, the third winding unit, and the fourth winding unit is disposed in the fourth slot.

12. The power supply circuit according to claim 11, wherein the first winding unit and the second winding unit are disposed with an electrical angle shifted by 45°, and the third winding unit and the fourth winding unit are disposed with an electrical angle shifted by 45°.

13. The power supply circuit according to claim 9, wherein the first winding unit and the second winding unit, and the third winding unit and the fourth winding unit are disposed with an electrical angle shifted by 90°.

14. The power supply circuit according to claim 1, the rotary electric machine further including a third phase winding which includes a seventh winding unit and an eighth winding unit, the power supply circuit further comprising:

a third circuit that is connectable to the power supply in parallel with the first circuit and the second circuit and is connected to the third phase winding, wherein the third circuit includes: ninth to twelfth arms in each of which an upper arm provided with a switching element and a lower arm provided with a switching element are connected at a midpoint of each arm; and a third switch, the midpoint of the ninth arm is connected to one end of the seventh winding unit, the midpoint of the tenth arm is connected to another end of the seventh winding unit, the midpoint of the eleventh arm is connected to one end of the eighth winding unit, the midpoint of the twelfth arm is connected to another end of the eighth winding unit, and the third switch is connected between the midpoint of the tenth arm and the midpoint of the eleventh arm.

15. A rotary electric machine system comprising:

a rotary electric machine including a first phase winding and a second phase winding; and a power supply circuit configured to supply electric power to the rotary electric machine, wherein the first phase winding includes a first winding unit and a second winding unit, the second phase winding includes a third winding unit and a fourth winding unit, the power supply circuit includes a first circuit that is connected to a power supply and is connected to the first phase winding, and a second circuit that is connected to the power supply in parallel with the first circuit and is connected to the second phase winding, the first circuit includes: first to fourth arms in each of which an upper arm provided with a switching element and a lower arm provided with a switching element are connected at a midpoint of each arm; and a first switch, the midpoint of the first arm is connected to one end of the first winding unit, the midpoint of the second arm is connected to another end of the first winding unit, the midpoint of the third arm is connected to one end of the second winding unit, the midpoint of the fourth arm is connected to another end of the second winding unit, the first switch is connected between the midpoint of the second arm and the midpoint of the third arm, the second circuit includes: fifth to eighth arms in each of which an upper arm provided with a switching element and a lower arm provided with a switching element are connected at a midpoint of each arm; and a second switch, the midpoint of the fifth arm is connected to one end of the third winding unit, the midpoint of the sixth arm is connected to another end of the third winding unit, the midpoint of the seventh arm is connected to one end of the fourth winding unit, the midpoint of the eighth arm is connected to another end of the fourth winding unit, and the second switch is connected between the midpoint of the sixth arm and the midpoint of the seventh arm.

* * * * *